United States Patent
Wang et al.

(10) Patent No.: US 12,143,303 B2
(45) Date of Patent: Nov. 12, 2024

(54) TRAFFIC SENDING METHOD AND APPARATUS

(71) Applicant: Huawei Technologies Co., Ltd., Shenzhen (CN)

(72) Inventors: Dawei Wang, Beijing (CN); Jingqing Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 429 days.

(21) Appl. No.: 17/562,668

(22) Filed: Dec. 27, 2021

(65) Prior Publication Data

US 2022/0124040 A1   Apr. 21, 2022

Related U.S. Application Data

(63) Continuation of application No. PCT/CN2020/094792, filed on Jun. 7, 2020.

(30) Foreign Application Priority Data

Jun. 27, 2019   (CN) .......................... 201910570361.2

(51) Int. Cl.
*H04L 47/24* (2022.01)
*H04L 47/12* (2022.01)

(52) U.S. Cl.
CPC .............. *H04L 47/24* (2013.01); *H04L 47/12* (2013.01)

(58) Field of Classification Search
CPC ................................. H04L 47/12; H04L 47/24
See application file for complete search history.

(56) References Cited

U.S. PATENT DOCUMENTS

| | | | | |
|---|---|---|---|---|
| 5,649,108 A | * | 7/1997 | Spiegel ................... | H04L 45/22 709/241 |
| 6,493,317 B1 | * | 12/2002 | Ma ........................... | H04L 47/11 370/395.52 |
| 6,831,895 B1 | * | 12/2004 | Ji .............................. | H04L 45/20 709/239 |

(Continued)

FOREIGN PATENT DOCUMENTS

| CN | 103166872 A | 6/2013 |
|---|---|---|
| CN | 103560971 A | 2/2014 |

(Continued)

*Primary Examiner* — Melanie Jagannathan
(74) *Attorney, Agent, or Firm* — Leydig, Voit & Mayer, Ltd.

(57) ABSTRACT

This application discloses a traffic sending method and apparatus, and the method includes: A first network device receives first traffic comprising first attribute information, wherein the first attribute information identifies a first traffic type of the first traffic; when a first link from the first network device to a second network device is congested, the first network device adjusts a first cost corresponding to the first traffic type to a second cost, wherein the first link is used to forward the first traffic when the cost corresponding to the first traffic is the first cost; and the first network device sends the first traffic to a third network device via a second link from the first network device to the third network device. In this way, ensuring that all traffic in the network can be effectively forwarded, and improving a traffic forwarding rate.

17 Claims, 8 Drawing Sheets

(56) References Cited

U.S. PATENT DOCUMENTS

| | | | |
|---|---|---|---|
| 8,260,959 B2* | 9/2012 | Rudkin | H04L 47/70 709/224 |
| 8,730,931 B1* | 5/2014 | Wu | H04W 72/20 370/338 |
| 10,630,579 B1* | 4/2020 | Plenderleith | H04L 45/38 |
| 10,742,555 B1* | 8/2020 | Shalev | H04L 67/563 |
| 2004/0049595 A1* | 3/2004 | Sun | H04L 45/00 709/238 |
| 2005/0091350 A1* | 4/2005 | Bejerano | H04Q 3/0079 709/223 |
| 2006/0067217 A1* | 3/2006 | Li | H04L 45/00 370/392 |
| 2006/0149852 A1* | 7/2006 | Schollmeier | H04L 45/00 709/238 |
| 2010/0142448 A1* | 6/2010 | Schlicht | H04W 28/021 370/328 |
| 2012/0134260 A1 | 5/2012 | Chou et al. | |
| 2012/0140636 A1* | 6/2012 | Resende | H04L 45/08 370/238 |
| 2014/0219082 A1* | 8/2014 | Geijer Lundin | H04L 47/24 370/229 |
| 2016/0164741 A1* | 6/2016 | Durgin | H04L 43/20 370/255 |
| 2016/0234234 A1* | 8/2016 | McGrew | H04L 63/20 |
| 2016/0277959 A1 | 9/2016 | Venkataraman et al. | |
| 2017/0230267 A1* | 8/2017 | Armolavicius | H04L 43/062 |
| 2018/0041440 A1 | 2/2018 | Goemaere et al. | |
| 2018/0191621 A1* | 7/2018 | Karthikeyan | H04L 47/805 |
| 2018/0270284 A1* | 9/2018 | Lee | H04L 45/20 |
| 2018/0324083 A1* | 11/2018 | Caire | H04L 45/124 |
| 2019/0150080 A1* | 5/2019 | Davies | H04W 28/0252 370/329 |
| 2019/0158371 A1* | 5/2019 | Dillon | H04L 47/196 |
| 2019/0238449 A1* | 8/2019 | Michael | H04L 45/123 |
| 2019/0320491 A1* | 10/2019 | Shukair | H04W 72/1268 |
| 2019/0373526 A1* | 12/2019 | Chow | H04W 8/04 |
| 2020/0112905 A1* | 4/2020 | Railkar | H04L 45/22 |
| 2020/0186459 A1* | 6/2020 | Fiaschi | H04L 45/123 |
| 2021/0211371 A1* | 7/2021 | Ceccarelli | H04L 45/64 |

FOREIGN PATENT DOCUMENTS

| | | |
|---|---|---|
| CN | 105763467 A | 7/2016 |
| CN | 107454015 A | 12/2017 |
| CN | 108063732 A | 5/2018 |
| CN | 108322925 A | 7/2018 |
| CN | 109617819 A | 4/2019 |
| KR | 20070009102 A | 1/2007 |
| WO | 02082720 A2 | 10/2002 |

* cited by examiner

TRAFFIC SENDING METHOD AND APPARATUS

CROSS-REFERENCE TO RELATED APPLICATIONS

This application is a continuation of International Application No. PCT/CN2020/094792, filed on Jun. 7, 2020, which claims priority to Chinese Patent Application No. 201910570361.2, filed on Jun. 27, 2019. The disclosures of the aforementioned applications are hereby incorporated by reference in their entireties.

TECHNICAL FIELD

This application relates to the field of communications technologies, and in particular, to a traffic sending method and apparatus.

BACKGROUND

With popularization of a network and development of internet services, a bandwidth resource requirement for the network is continuously increased. Generally, in the network, a shortest path is calculated based on link costs between network devices by using a shortest path first (SPF for short) algorithm, so that traffic is forwarded in the network based on the shortest path. Because all traffic preempts the shortest path in the network, once traffic in the network increases, a link between some network devices in the network is very likely to be congested.

Currently, for link congestion between a first network device and a second network device, a queue technology is used. To be specific, traffic that flows into the first network device and is to flow into the second network device is placed in queues of different priorities, traffic in a high-priority queue is preferably forwarded to the second network device, and when there is a remaining bandwidth resource, traffic in some low-priority queues is forwarded to the second network device by using the remaining bandwidth, and traffic in another low-priority queue is discarded.

However, in the foregoing manner of processing link congestion between network devices by using the queue technology, some traffic needs to be discarded, and it cannot be ensured that all traffic entering the network is forwarded in the network.

SUMMARY

Based on this, embodiments of this application provide a traffic sending method and apparatus, to avoid preemption of a bandwidth resource on a congested link as much as possible by adjusting link costs, so that some traffic properly uses a bandwidth resource on another non-congested link in a network, thereby improving a traffic forwarding rate in the network.

According to a first aspect, an embodiment of this application provides a traffic sending method, and for example, the method may include: A first network device receives first traffic, and determines, based on attribute information of the first traffic, that the first traffic belongs to a first traffic type: when a link from the first network device to a second network device is congested, the first network device adjusts a first cost corresponding to the first traffic type to a second cost, where the second network device is a next hop that is determined by the first network device based on the first cost and to which the first traffic is to be sent: the first network device determines, based on the second cost obtained after the adjustment, that the next hop to which the first network device is to send the first traffic is a third network device; and the first network device sends the first traffic to the third network device. That the link from the first network device to the second network device is congested may be: Within first preset duration, an actual traffic rate from the first network device to the second network device is greater than maximum physical link bandwidth between the first network device and the second network device: or within second preset duration, an average traffic rate from the first network device to the second network device is greater than preset first physical link bandwidth: where the preset first physical link bandwidth is less than the maximum physical link bandwidth. In this way, in the method provided in this embodiment of this application, costs corresponding to different traffic types on a congested link are adjusted, to avoid, as much as possible, a case in which all types of traffic preempt a bandwidth resource on the congested link, so that some types of traffic can properly use a bandwidth resource on another non-congested link in a network, to ensure that all traffic in the network can be effectively forwarded, and improve a traffic forwarding rate in the network.

It may be understood that attribute information of traffic is carried in the traffic, and is used to identify a traffic type to which the traffic belongs. In one case, the attribute information may be specifically a traffic identifier corresponding to a priority identifier in a quality of service (QOS for short) concept, and is used to indicate a specific priority of the traffic in the QoS concept, for example, is a traffic identifier used to indicate that the traffic is BE traffic. In another case, the attribute information may be specifically at least one traffic feature in a quintuple of the traffic, for example, a destination IP address, or a source IP address and a destination IP address.

With reference to an embodiment of the first aspect, when the first network device receives traffic corresponding to two different traffic types, this embodiment of this application may further include: The first network device receives first traffic and second traffic, determines, based on attribute information of the first traffic, that the first traffic belongs to a first traffic type, and determines, based on attribute information of the second traffic, that the second traffic belongs to a second traffic type, where the first traffic type and the second traffic type are different: when a link from the first network device to a second network device is congested, the first network device adjusts a first cost corresponding to the first traffic type to a second cost, and adjusts a third cost corresponding to the second traffic type to a fourth cost, where the second network device is a next hop that is determined by the first network device based on the first cost and the third cost and to which the first traffic and the second traffic are to be sent: in this case, the first network device determines, based on the second cost, that a next hop to which the first traffic is to be sent is a third network device, and determines, based on the fourth cost, that a next hop to which the second traffic is to be sent is the second network device; and therefore, the first network device may send the first traffic to the third network device, and send the second traffic to the second network device. In this way, costs corresponding to different traffic types on a congested link are adjusted, so that the first traffic avoids the congested link from the first network device to the second network device, and properly uses a non-congested link from the first network device to the third network device in the network. In addition, it is ensured that all the second traffic can be forwarded on the original link from the first network device to the second network device, thereby effectively forwarding traffic in the network, and improving a traffic forwarding rate in the network.

It may be understood that a correspondence between each traffic type and a corresponding cost is prestored on the first network device. For example, a first mapping relationship is preset on the first network device, and the first mapping relationship includes a correspondence between the first traffic type and the first cost and a correspondence between the second traffic type and the third cost: or a second mapping relationship is preset on the first network device, and the second mapping relationship includes a correspondence between the first traffic type, a first forwarding priority, and the first cost and a correspondence between the second traffic type, a second forwarding priority, and the third cost. The first cost is equal to the third cost. Traffic types are used to distinguish between different traffic, and may be specifically different traffic obtained through classification based on the priority identifier in the QoS concept, for example, AF traffic or BE traffic, or may be different traffic obtained through classification based on a traffic feature, for example, traffic with different destination IP addresses separately corresponds to different traffic types. It should be noted that the traffic type may be flexibly configured in advance based on an actual requirement.

With reference to another embodiment of the first aspect, that the first network device adjusts a first cost corresponding to the first traffic type to a second cost may specifically include: The first network device increases the first cost to obtain the second cost corresponding to the first traffic type, where the third network device and the second network device are different network devices: or the first network device reduces the first cost or keeps the first cost unchanged, to obtain the second cost corresponding to the first traffic type, where the third network device and the second network device are a same network device. It can be learned that different adjustment policies may be flexibly used for costs corresponding to different traffic types in a preconfigured adjustment manner, to effectively forward traffic.

With reference to still another embodiment of the first aspect, after the first network device adjusts the first cost corresponding to the first traffic type to the second cost, this embodiment of this application may further include: The first network device sends a correspondence between the first traffic type and the second cost to another network device. In this way, each network device in the network may learn of statuses of another network device and another link in the network, so that the network device in the network redetermines a forwarding path based on a current global situation, thereby providing a data basis for effective forwarding of traffic in the network.

With reference to another embodiment of the first aspect, after the first network device adjusts the first cost corresponding to the first traffic type to the second cost, this embodiment of this application may further include: The first network device determines, based on preset duration, whether the link from the first network device to the second network device is congested; and when the link from the first network device to the second network device is not congested, the first network device restores the second cost corresponding to the first traffic type to the first cost. That the link from the first network device to the second network device is not congested may be specifically: Within third preset duration, an actual traffic rate from the first network device to the second network device is less than preset second physical link bandwidth: or within fourth preset duration, an average traffic rate from the first network device to the second network device is less than preset third physical link bandwidth: where the preset third physical link bandwidth is less than the preset first physical link bandwidth. Traffic in the network changes dynamically in real time. Therefore, a time at which link congestion occurs and time for which link congestion is maintained are not fixed. It can be learned that, in this embodiment of this application, whether a link is congested is monitored, and when the link is not congested, a cost of the link is restored to an unadjusted cost, and the traffic is forwarded by using a shortest path calculated by using the unadjusted cost, so that a forwarding latency of the traffic can be reduced.

With reference to still another embodiment of the first aspect, that the first network device determines, based on the second cost, that the next hop to which the first traffic is to be sent is the third network device may specifically include: The first network device determines, based on the second cost, a path for sending the first traffic; and the first network device determines, based on the path for sending the first traffic, that a next hop of the first network device is the third network device. It can be learned that another path different from the congested path is determined based on a cost obtained after the adjustment, to avoid discarding some packets, and properly use network resources, thereby improving packet forwarding efficiency.

According to a second aspect, an embodiment of this application further provides a first network device for sending traffic, and the first network device may include a first receiving unit, a first determining unit, a first adjustment unit, a second determining unit, and a first sending unit. The first receiving unit is configured to receive first traffic. The first determining unit is configured to determine, based on attribute information of the first traffic, that the first traffic belongs to a first traffic type. The first adjustment unit is configured to: when a link from the first network device to a second network device is congested, adjust a first cost corresponding to the first traffic type to a second cost, where the second network device is a next hop that is determined by the first network device based on the first cost and to which the first traffic is to be sent. The second determining unit is configured to determine, based on the second cost, that the next hop to which the first network device is to send the first traffic is a third network device. The first sending unit is configured to send the first traffic to the third network device.

With reference to an embodiment of the second aspect, the first network device may further include a second receiving unit, a third determining unit, a second adjustment unit, a fourth determining unit, and a second sending unit. The second receiving unit is configured to receive second traffic. The third determining unit determines, based on attribute information of the second traffic, that the second traffic belongs to a second traffic type, where the first traffic type is different from the second traffic type. The second adjustment unit is configured to: when the link from the first network device to the second network device is congested, adjust a third cost corresponding to the second traffic type to a fourth cost, where the second network device is a next hop that is determined by the first network device based on the third cost and to which the second traffic is to be sent. The fourth determining unit is configured to determine, based on the fourth cost, that the next hop to which the second traffic is to be sent is the second network device. The second sending unit is configured to send the second traffic to the second network device.

It may be understood that, a first mapping relationship is preset on the first network device, and the first mapping relationship includes a correspondence between the first traffic type and the first cost and a correspondence between the second traffic type and the third cost: or a second mapping relationship is preset on the first network device, and the second mapping relationship includes a correspondence between the first traffic type, a first forwarding priority, and the first cost and a correspondence between the second traffic type, a second forwarding priority, and the third cost. The first cost is equal to the third cost.

With reference to another embodiment of the second aspect, the first adjustment unit of the first network device is specifically configured to: increase, by the first network device, the first cost to obtain the second cost corresponding to the first traffic type, where the third network device and the second network device are different network devices: or reduce, by the first network device, the first cost or keep the first cost unchanged, to obtain the second cost corresponding to the first traffic type, where the third network device and the second network device are a same network device.

With reference to still another embodiment of the second aspect, the apparatus may further include a third sending unit. The third sending unit is configured to: after the first cost corresponding to the first traffic type is adjusted to the second cost, send a correspondence between the first traffic type and the second cost to another network device.

With reference to an embodiment of the second aspect, the apparatus may further include a judgment unit and a third adjustment unit. The judgment unit is configured to: after the first cost corresponding to the first traffic type is adjusted to the second cost, determine, based on preset duration, whether the link from the first network device to the second network device is congested. The third adjustment unit is configured to: when the link from the first network device to the second network device is not congested, restore the second cost corresponding to the first traffic type to the first cost.

With reference to yet another embodiment of the second aspect, the second determining unit of the apparatus includes a first determining subunit and a second determining subunit. The first determining subunit is configured to determine, based on the second cost, a path for sending the first traffic. The second determining subunit is configured to determine, based on the path for sending the first traffic, that a next hop of the first network device is the third network device.

It should be noted that the traffic sending apparatus provided in the second aspect corresponds to the traffic sending method provided in the first aspect. Therefore, for various possible implementations and achieved technical effects of the traffic sending apparatus provided in the second aspect, refer to the foregoing descriptions of the traffic sending method provided in the first aspect.

According to a third aspect, an embodiment of this application further provides a network device, and the network device includes a memory and a processor. The memory is configured to store program code. The processor is configured to run instructions in the program code, to enable the network device to perform the traffic sending method in any implementation of the first aspect.

According to a fourth aspect, an embodiment of this application further provides a computer program product, and when the computer program product is run on a computer, the computer is enabled to perform the traffic sending method in any implementation of the first aspect.

According to a fifth aspect, an embodiment of this application further provides a computer-readable storage medium, the computer-readable storage medium stores instructions, and when the instructions are run on a computer, the computer is enabled to perform the traffic sending method in any implementation of the first aspect.

BRIEF DESCRIPTION OF DRAWINGS

To describe the technical solutions of embodiments of this application more clearly, the following briefly describes the accompanying drawings required for describing the embodiments. It is clearly that the accompanying drawings in the following descriptions show merely some embodiments recorded in this application, and a person of ordinary skill in the art may still derive other accompanying drawings based on these accompanying drawings.

DESCRIPTION OF EMBODIMENTS

As an amount of data transmitted in a network increases, a link bandwidth resource between network devices faces a greater challenge. Specifically, when the link bandwidth allocated between network devices is relatively small, and the relatively small link bandwidth cannot meet a relatively large traffic rate transmitted on a link, the link is congested. When a link between network devices in the network is congested, a transmission latency of traffic usually increases, and in a severe case, a packet loss is further generated, causing a problem that quality of service in the network is degraded and even unavailable.

Quality of service (QOS for short) is a basic feature of the network, and an important application is congestion management. Generally, when the link between network devices is congested, congestion management may be performed by using a queue technology, to be specific, traffic that is to pass through the congested link is placed in a plurality of queues based on priorities, different priorities are preconfigured for the queues, and traffic in a high-priority queue preferably occupies a link bandwidth resource of the congested link, and is sent from the congested link. When there is a remaining bandwidth resource, traffic in some low-priority queues is sent from the congested link in descending order of priorities by using the remaining link bandwidth resource. When there is no remaining link bandwidth resource on the congested link, traffic in other low-priority queues is directly discarded.

Figure 1:
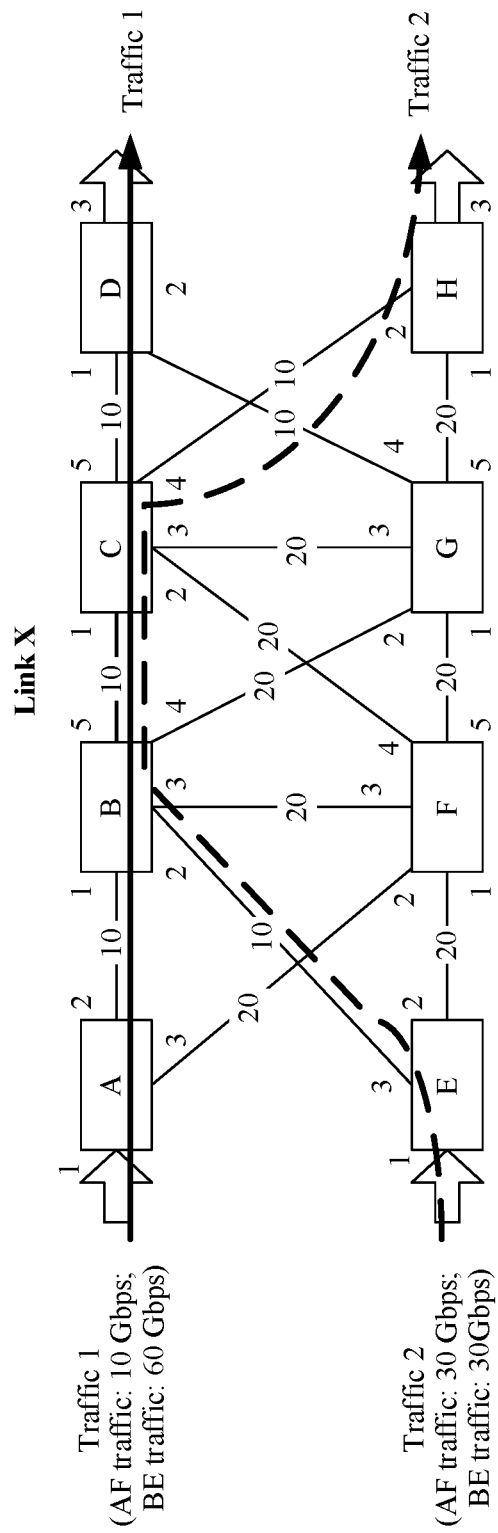
FIG. 1 is a schematic diagram of traffic sending in an application scenario according to an embodiment of this application.

For example, a network shown in FIG. 1 includes network devices A, B, C, D, E, F, G, and H, after a shortest path is calculated based on a shortest path first (SPF for short) algorithm and based on a cost of each link in the network, it is determined that traffic 1 enters the network from a port 1 of the network device A (A1 port for short), passes through a port A2, a port B1, a port B5, a port C1, a port C5, and a port DI, and is forwarded out of the network from a port D3; and it is determined that traffic 2 enters the network from a port 1 of the network device E, passes through a port E3, a port B2, the port B5, the port C1, a port C4, and a port H2, and is forwarded out of the network from a port H3. It is assumed that the traffic 1 is 70 Gbps (a traffic rate unit Gbps is 1000 megabits per second), and includes assured forwarding (AF for short) traffic of 10 Gbps and best effort (BE for short) traffic of 60 Gbps. The traffic 2 is traffic of 60 Gbps, and includes AF traffic of 30 Gbps and BE traffic of 30 Gbps. Maximum physical link bandwidth of a link X is 70 Gbps. In this way, both the traffic 1 and the traffic 2 need to reach the port C1 from the port B5 through the link X, and an actual traffic rate of the traffic 1 and an actual traffic rate of the traffic 2 are greater than the maximum physical link bandwidth of the link X. Therefore, the link X is congested.

For example, if congestion on the link X is managed by using a queue technology, a specific process may be as follows: In a first step, the traffic 1 and the traffic 2 that are to be forwarded from the link X are separately placed in a high-priority queue 1 and a low-priority queue 2. Specifically, the AF traffic of 10 Gbps in the traffic 1 and the AF traffic of 30 Gbps in the traffic 2 are placed in the high-priority queue 1, and the BE traffic of 60 Gbps in the traffic 1 and the BE traffic of 30 Gbps in the traffic 2 are placed in the low-priority queue 2. In a second step. AF traffic of 30 Gbps in the high-priority queue 1 is sent from the link X, and BE traffic of 30 Gbps is selected from the BE traffic of 90 Gbps in the low-priority queue 2 to occupy a remaining bandwidth resource of 30 Gbps of the link X. In a third step, because all bandwidth resources of the link X are occupied, remaining BE traffic of 60 Gbps in the low-priority queue 2 is discarded, to ensure normal forwarding of high-priority traffic.

It can be learned that, link congestion can be managed to some extent by using the queue technology, and traffic in the low-priority queue is locally discarded, to ensure that the high-priority traffic can be preferably forwarded based on the shortest path. However, in this manner, it cannot be ensured that all traffic entering the network is forwarded in the network.

Based on this, in the embodiments of this application, a correspondence between a traffic type and a cost is prestored on a network device. After receiving traffic, the network device may determine, based on attribute information of the traffic (for example, quintuple information of the traffic or an identifier of the traffic), a traffic type to which the traffic belongs. and when determining that a link of the traffic from the network device to a next hop of the network device is congested, the network device may adjust a cost corresponding to the traffic type, and redetermine, based on a cost obtained after the adjustment, a next hop to which the network device is to send the traffic. In this way, costs corresponding to different traffic types on a congested link are adjusted, to avoid, as much as possible, a case in which all types of traffic preempt a bandwidth resource on the congested link, so that some types of traffic can properly use a bandwidth resource on another non-congested link in the network, to ensure that all traffic in the network can be effectively forwarded, and improve a traffic forwarding rate in the network.

Figure 2:
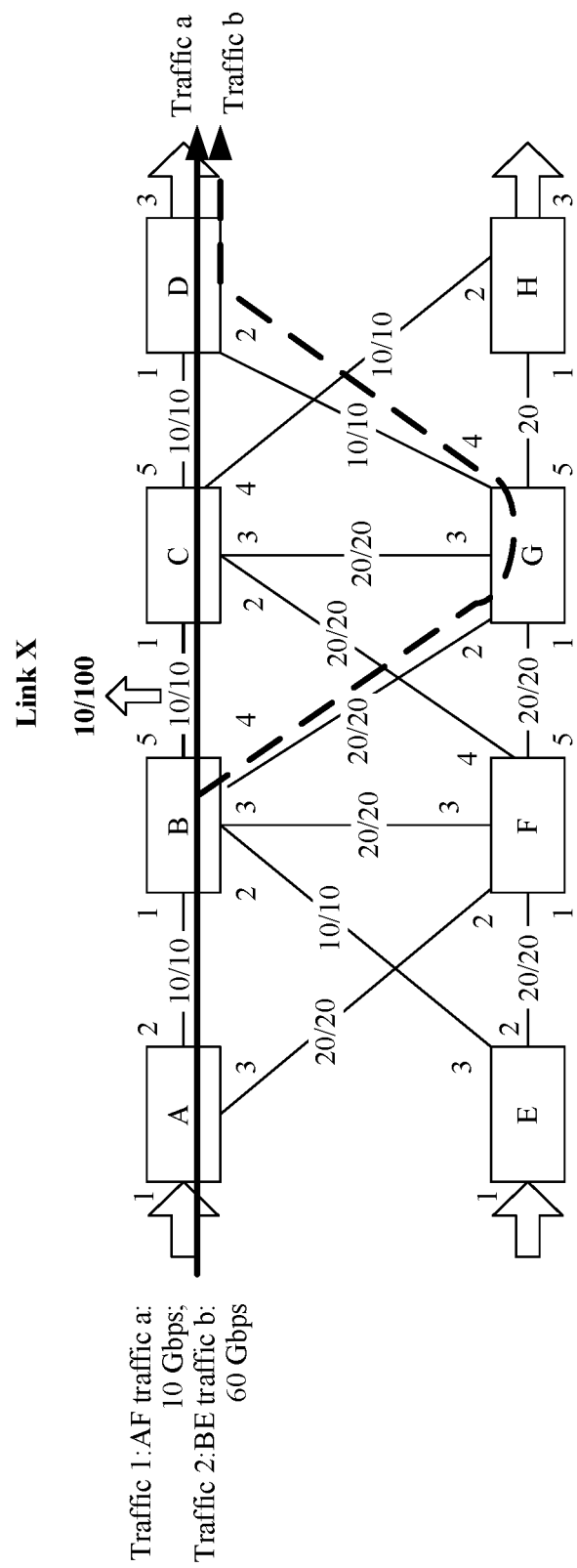
FIG. 2 is a schematic diagram of another type of traffic sending in an application scenario according to an embodiment of this application.

For example, the network corresponding to FIG. 1 is still used as a scenario to describe the traffic sending method provided in the embodiments of this application. It is assumed that the AF traffic is defined as a traffic type 1, and the BE traffic is defined as a traffic type 2. As shown in FIG. 2, each network device stores two traffic types and costs corresponding to the two traffic types, and a mapping relationship of the link X is prestored on the network device B. The mapping relationship includes a relationship between the traffic type 1 and a cost 10 and a relationship between the traffic type 2 and the cost 10.

For example, when the traffic 1 and the traffic 2 enter the network, it can be determined, based on a shortest path first algorithm or a manually configured path, that the traffic 1 and the traffic 2 pass through the link X and the link X is congested. In this case, the traffic 1 is used as an example. The network device B determines, based on a traffic identifier in the traffic 1, that traffic a of 10 Gbps in the traffic 1 belongs to the traffic type 1 and traffic b of 60 Gbps belongs to the traffic type 2. The network device B adjusts a cost corresponding to the traffic type 2 to 100, and publishes an adjusted mapping relationship to another network device in the network. In this case, each network device may calculate, based on the shortest path first algorithm, a shortest path 1 corresponding to the traffic type I and a shortest path 2 corresponding to the traffic type 2, and generate, on each network device, a forwarding table I corresponding to the traffic type 1 and a forwarding table 2 corresponding to the traffic type 2. For the network device B, a forwarding table 1 on the network device B indicates that a next hop is the network device C, and a forwarding table 2 indicates that a next hop is the network device G. In this case, the network device B sends the traffic a of 10 Gbps that belongs to the traffic type 1 from the port B2 to the port C1 through the link X, and sends the traffic b of 60 Gbps that belongs to the traffic type 2 from a port B4 to a port G2. In this way, costs corresponding to different traffic types on a congested link are adjusted, to avoid a case in which all types of traffic preempt a bandwidth resource on the congested link, so that some types of traffic can properly use a bandwidth resource on another non-congested link in the network, to ensure that all traffic in the network can be effectively forwarded, and improve a traffic forwarding rate in the network.

It may be understood that the foregoing scenario is merely a scenario example provided in the embodiments of this application, and the embodiments of this application are not limited to this scenario.

Before the traffic sending method provided in the embodiments of this application is described, related descriptions of a process of presetting a traffic type and a cost on a network device and related concepts involved in the embodiments of this application are provided first.

It may be understood that a correspondence between a traffic type of a related link of each network device in a network and a cost is prestored on the network device. For example, it is assumed that a first network device is separately directly connected to a second network device and a third network device. In this case, for a link X from the first network device to the second network device, a relationship between a traffic type 1 and a cost 1, a relationship between a traffic type 2 and a cost 2, . . . , and a relationship between a traffic type N (N is an integer greater than 1) and a cost n (n is a non-zero positive number) are stored on the first network device, and may be denoted as a mapping relationship 1 corresponding to the link X. For a link Y from the first network device to the third network device, a relationship between the traffic type I and a cost 1', a relationship between the traffic type 2 and a cost 2' . . . , and a relationship between the traffic type N (N is an integer greater than 1) and a cost n' (n' is a non-zero positive number) are stored on the first network device, and may be denoted as a mapping relationship 2 corresponding to the link Y.

To ensure that when no congestion occurs in the network, all traffic can be forwarded based on a shortest path, and a cost corresponding to each traffic type may be set to be equal. For example, it may be set as follows: the cost 1=the cost 2= . . . =the cost n, and the cost 1'=the cost 2'= . . . =the cost n'.

Figure 5:
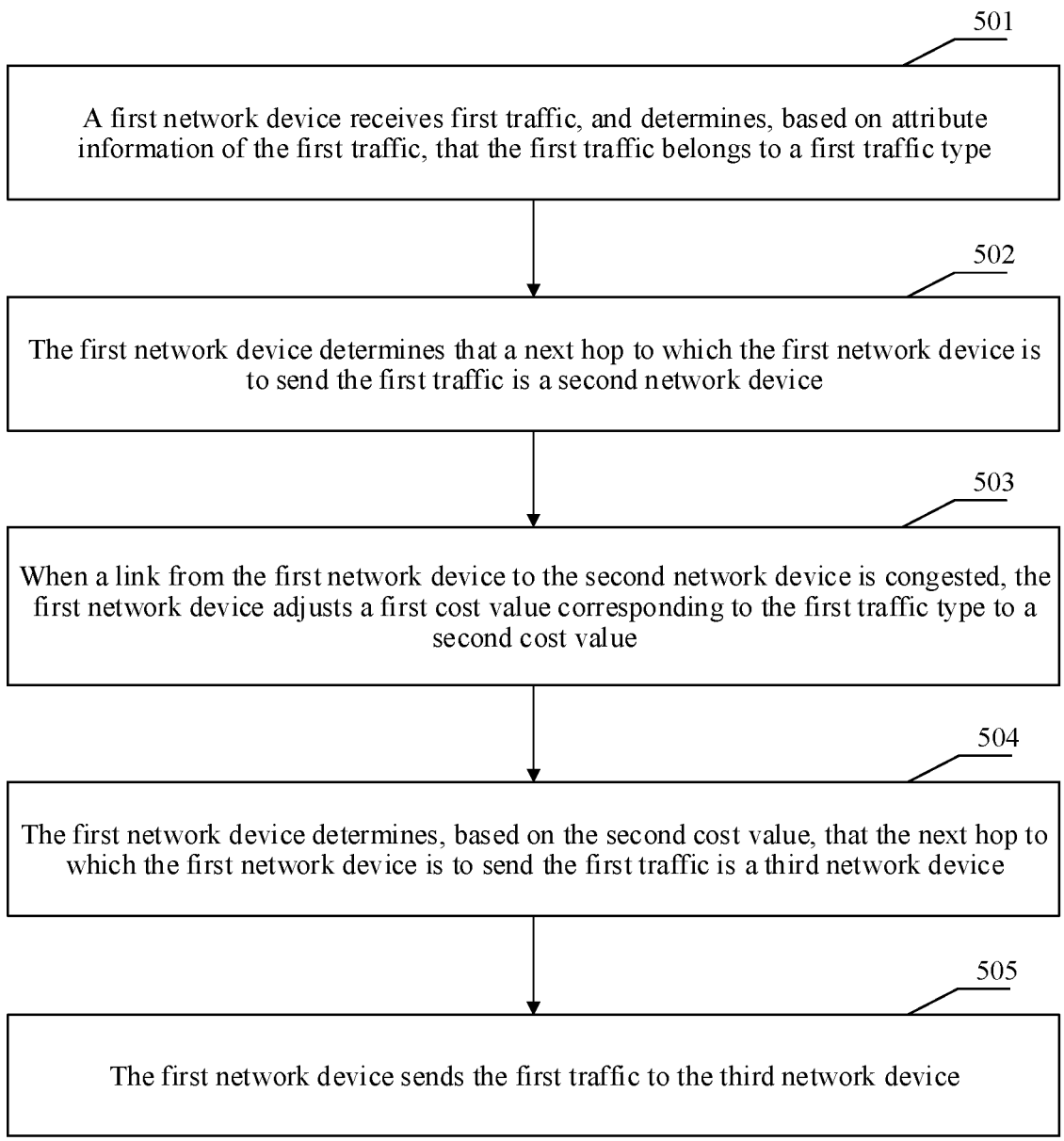
FIG. 5 is a schematic flowchart of a traffic sending method according to an embodiment of this application.

In specific implementation, for the first network device in the network, before the following traffic sending method shown in FIG. 5 is performed, the following steps may be further included: S11: The first network device obtains a correspondence between a traffic type and a cost on a link originating from the first network device. S12: The first network device stores the correspondence between a traffic type and a cost. S11 may be specifically obtained based on configuration information configured by a person skilled in the art on the first network device. Alternatively, configuration information sent by another network device may be received, and configuration information related to the first network device is obtained from the configuration information sent by the another network device.

A network device may store the correspondence between a traffic type and a cost in a form of a mapping relationship. The mapping relationship stored on the network device may include only the correspondence between a traffic type and a cost. Alternatively, to ensure forwarding performance of traffic of some traffic types, for example, a forwarding latency, corresponding forwarding priorities may also be configured for different traffic types. In other words, the mapping relationship stored on the network device may alternatively include a correspondence between a traffic type, a forwarding priority, and a cost. In this way, when congestion occurs, a cost corresponding to a traffic type with a low forwarding priority may be increased, so that traffic corresponding to the traffic type with the low forwarding priority is forwarded from another link, and does not occupy a bandwidth resource of the congested link any longer, thereby ensuring that traffic of a traffic type with a high forwarding priority is forwarded from an original path, and reducing a forwarding latency of the traffic. In this embodiment of this application, storage of the correspondence between a traffic type and a cost is used as an example for description.

It should be noted that a definition and configuration of the traffic type on each network device in the network is global, in other words, traffic classification standards on the network devices are consistent, and same traffic may be classified into a same traffic type. For example, if a network device 1 receives traffic 1, it may be determined that the traffic belongs to a traffic type 1, and if another network device in the network receives the traffic 1, it may also be determined that the traffic belongs to the traffic type 1.

It should be noted that the correspondence that is between a traffic type and a cost and that is stored on each network device in the network may be global configuration information. In one case, configuration information of all network devices in the network may be configured on one network device, and the configuration information of all the network devices is published in the network, to indicate each network device to obtain and store a correspondence between a related traffic type and a cost on the network device. In another case, a correspondence between a related traffic type and a cost of each network device may be alternatively configured on the network device. In this case, each network device needs to publish, in the network, the correspondence that is between a related traffic type and a cost of the network device and that is configured on the network device, to determine a global forwarding path based on the configuration information of the entire network.

Figure 3:
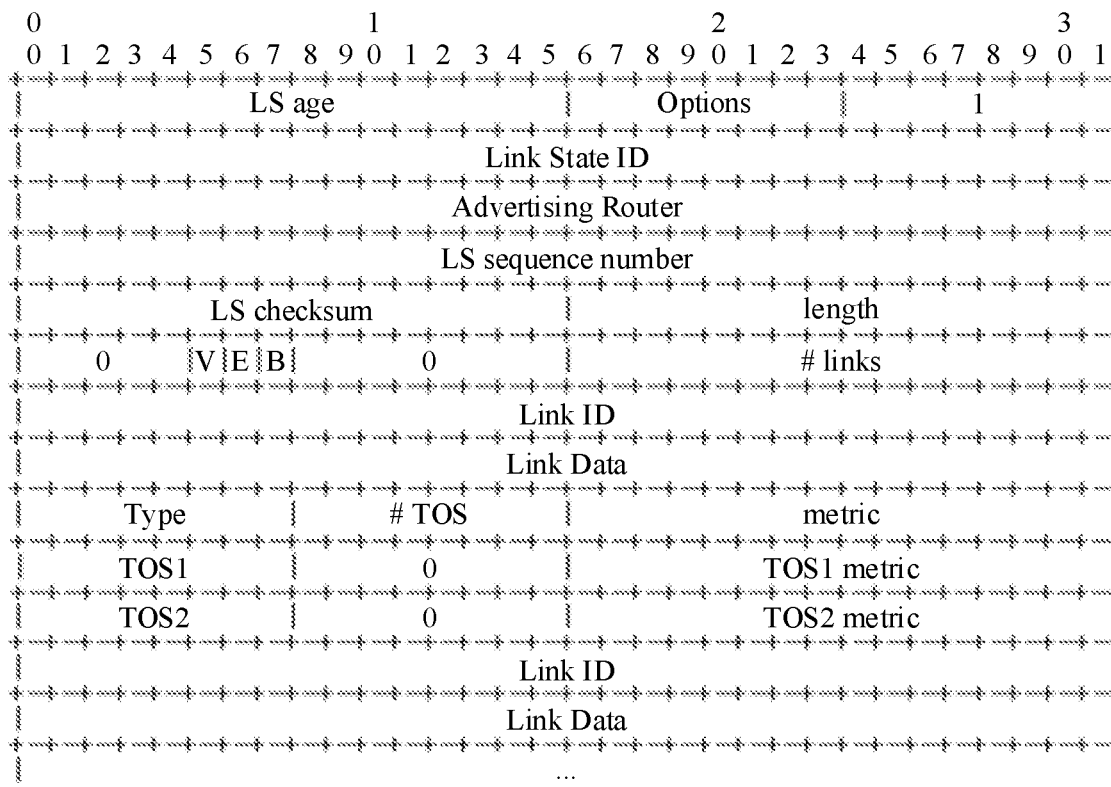
FIG. 3 is a schematic diagram of multiplexing of a router LSA in an OSPFv2 protocol according to an embodiment of this application.
Figure 4:
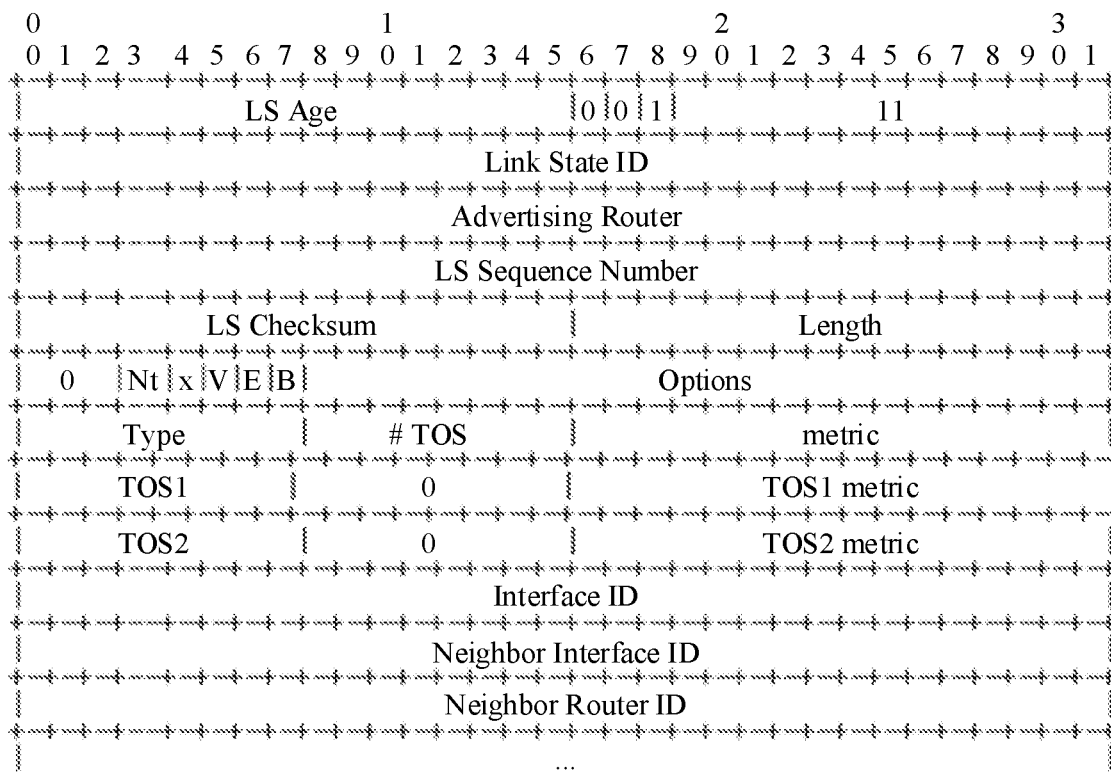
FIG. 4 is a schematic diagram of extension of a router LSA in an OSPFv3 protocol according to an embodiment of this application.

For a specific manner in which the network device publishes the correspondence between a traffic type and a cost in the network, in one case, the correspondence between a traffic type and a cost may be carried in a type of service (TOS for short) field and a metric field in an extended or multiplexed link-state advertisement LSA of an open shortest path first (OSPF for short) protocol. For example, for an open shortest path first version 2 (OSPFv2 for short) protocol, as shown in FIG. 3, a TOS field and a metric field in a router link-state advertisement (router LSA for short) may be multiplexed. A #TOS field identifies a quantity of different traffic types or forwarding priorities. The metric field identifies a link cost. TOS identifies a traffic type or a forwarding priority. TOS metric identifies a link cost corresponding to the traffic type or the forwarding priority. When the traffic type 1 and the traffic type 2 are included and link costs corresponding to the traffic type 1 and the traffic type 2 are respectively 10 and 100, in the router LSA, a type field is followed by #TOS=2, metric=10. TOS1=1. TOS1 metric=10. TOS2=2, and TOS2 metric=100. For another example, for an open shortest path first version 3 (OSPFv3 for short) protocol, as shown in FIG. 4, a router link-state advertisement (router LSA for short) may be extended, and a TOS field and a metric field in the router link-state advertisement are used. For a carrying manner, refer to the foregoing related descriptions of OSPFv2. In another case, the correspondence between a traffic type and a cost may be alternatively carried in a topology number MT ID reserved by a type-length-value (TLV for short) of an intermediate system to intermediate system (ISIS for short) protocol. For example, it is assumed that two traffic types are preset. In this case, the two traffic types may be separately identified by using 3001 and 3002 reserved by the TLV. Content corresponding to the MT ID 3001 stores a cost corresponding to one traffic type, and content corresponding to the MT ID 3002 stores a cost corresponding to the other traffic type.

It may be understood that, traffic types are used to distinguish between different traffic, and may be specifically different traffic obtained through classification based on a priority identifier in a QoS concept, for example, AF traffic or BE traffic, or may be different traffic obtained through classification based on a traffic feature, for example, traffic with different destination IP addresses separately corresponds to different traffic types. It should be noted that the traffic type may be flexibly configured in advance based on an actual requirement.

In one case, for example, traffic may be classified based on a priority in the QoS concept, and a priority identifier corresponding to each traffic type is configured. Traffic may include class selector (CS for short) traffic, expedited forwarding (EF for short) traffic, AF traffic, and BE traffic in descending order of priorities in QoS. If only two traffic types are obtained through classification, the CS traffic may be configured to associate with a traffic type 1, and the EF traffic, the AF traffic, and the BE traffic may be configured to associate with a traffic type 2: or the CS traffic and the EF traffic may be configured to associate with a traffic type 1, and the AF traffic and the BE traffic may be configured to associate with a traffic type 2: or the CS traffic, the EF traffic, and the AF traffic may be configured to associate with a traffic type 1, and the BE traffic may be configured to associate with a traffic type 2. If three traffic types are obtained through classification, the CS traffic may be configured to associate with a traffic type 1, the EF traffic may be configured to associate with a traffic type 2, and the AF traffic and the BE traffic may be configured to associate with a traffic type 3: or the CS traffic may be configured to associate with a traffic type 1, the EF traffic and the AF traffic may be configured to associate with a traffic type 2, and the BE traffic may be configured to associate with a traffic type 3: or the CS traffic and the EF traffic may be configured to associate with a traffic type 1, the AF traffic may be configured to associate with a traffic type 2, and the BE traffic may be configured to associate with a traffic type 3. If four traffic types are obtained through classification, the CS traffic may be configured to associate with a traffic type 1, the EF traffic may be configured to associate with a traffic type 2, the AF traffic may be configured to associate with a traffic type 3, and the BE traffic may be configured to associate with the traffic type 4. In specific implementation, a correspondence between a traffic type and a traffic identifier may be preset on the network device. In this case, after receiving traffic, the network device may determine, by using a traffic identifier, a traffic type to which the traffic belongs. The traffic identifier may uniquely identify traffic corresponding to a specific priority that is in the QoS and to which the traffic belongs. It should be noted that the priority in a traffic type configuration process is a fixed priority that is in the QoS and that is defined for the traffic, and is different from a forwarding priority mentioned in the following embodiments of this application.

In another case, for example, traffic may be further allocated based on a traffic feature such as a quintuple of the traffic, and a corresponding traffic type is configured. For example, traffic with a same destination IP address may be classified into a same traffic type. For another example, traffic with a same source IP address and a same destination IP address may be classified into a same traffic type. In specific implementation, a correspondence between a traffic type and a traffic feature may be preset on the network device. In this case, after receiving traffic, the network device may determine, by using a traffic feature of the traffic, a traffic type to which the traffic belongs.

It may be understood that, in this embodiment of this application, that the link from the first network device to the second network device is congested may be specifically that the link meets at least one of the following two conditions: Condition 1: Within first preset duration, an actual traffic rate from the first network device to the second network device is greater than maximum physical link bandwidth between the first network device and the second network device. Condition 2: Within second preset duration, an average traffic rate from the first network device to the second network device is greater than preset first physical link bandwidth, where the preset first physical link bandwidth is less than the maximum physical link bandwidth. For example, the preset first physical link bandwidth may be 80% of the maximum physical link bandwidth. The first preset duration and the second preset duration may be equal or not equal, and may be flexibly set based on a requirement.

In this embodiment of this application, that the link from the first network device to the second network device is not congested may be specifically that the link meets at least one of the following two conditions: Condition 3: Within third preset duration, an actual traffic rate from the first network device to the second network device is less than preset second physical link bandwidth. Condition 4: Within fourth preset duration, an average traffic rate from the first network device to the second network device is less than preset third physical link bandwidth, where the preset third physical link bandwidth is less than the preset first physical link bandwidth. The conditions for being not congested may specifically correspond to the conditions for being congested, in other words, the preset second physical link bandwidth is equal to the maximum physical link bandwidth. Alternatively, to improve the condition for link non-congestion, the preset second physical link bandwidth may be set to 90% of the maximum physical link bandwidth, and in this case, the preset third physical link bandwidth may be 75% of the maximum physical link bandwidth.

It should be noted that the condition for link congestion and the condition for link non-congestion may be flexibly set based on an actual situation and a requirement for a network. For example, the link is considered as being congested when the condition 1 is met, and the link is considered as being not congested when the condition 3 or the condition 4 is met. For another example, the link is considered as being congested when the condition 2 is met, and the link is considered as being not congested when the condition 3 or the condition 4 is met. This is not limited in this embodiment of this application.

An embodiment of a traffic sending method of this application is described in detail below with reference to the accompanying drawings by using an embodiment.

FIG. 5 is a schematic flowchart of a traffic sending method according to an embodiment of this application. For example, the method may include step 501 to step 505.

Step 501: A first network device receives first traffic, and determines, based on attribute information of the first traffic, that the first traffic belongs to a first traffic type.

In specific implementation, after receiving the first traffic, the first network device may obtain a traffic attribute of the first traffic, for example, a traffic identifier of the first traffic or a quintuple of the first traffic, and then perform matching based on the traffic attribute and a preset traffic attribute corresponding to each traffic type, and if the traffic attribute matches the preset traffic attribute, may determine that the first traffic belongs to the traffic type. The successfully matched traffic type may be determined as the first traffic type to which the first traffic belongs.

Attribute information of traffic is carried in the traffic, and is used to identify a traffic type to which the traffic belongs. In one case, the attribute information may be specifically a traffic identifier corresponding to a priority identifier in a QoS concept, and is used to indicate a specific priority of the traffic in the QoS concept, for example, is a traffic identifier used to indicate that the traffic is BE traffic. In another case, the attribute information may be specifically at least one traffic feature in a quintuple of the traffic, for example, a destination IP address or a source IP address and a destination IP address.

For example, if a traffic type in a correspondence that is between a traffic type and a cost and that is prestored on the first network device is a traffic identifier obtained after classification is performed based on the priority identifier in the QoS concept, and in addition, in the first network device, CS traffic and EF traffic are configured to be associated with a traffic type 1, and AF traffic and BE traffic are configured to be associated with a traffic type 2, after receiving the first traffic, the first network device obtains the traffic identifier of the first traffic by parsing the first traffic, to indicate that the first traffic is the BE traffic, and may determine, by separately matching the BE traffic with traffic identifiers in the traffic type 1 and the traffic type 2, that the first traffic successfully matches the traffic type 2. Therefore, the first traffic type to which the first traffic belongs may be determined as the traffic type 2.

For another example, if a traffic type in a correspondence that is between a traffic type and a cost and that is prestored on the first network device is determined based on a destination IP address in a traffic feature, and there is at least the following configuration on the first network device: 4.4.4.4 is associated with the traffic type 1, and 8.8.8.8 is associated with the traffic type 2. Therefore, after receiving the first traffic, the first network device obtains a traffic feature of the first traffic by parsing the first traffic, to indicate that a destination IP address of the first traffic is 4.4.4.4, and may determine, by separately matching 4.4.4.4 with traffic features in the traffic type 1 and the traffic type 2, that the first traffic successfully matches the traffic type 1. Therefore, the first traffic type to which the first traffic belongs may be determined as the traffic type 1.

It should be noted that, in this embodiment of this application, in step 501, the first network device stores the correspondence between a traffic type and a cost. In one case, the correspondence may be stored in a form of a first mapping relationship. For example, the first mapping relationship may specifically include a correspondence between the first traffic type and a first cost, a correspondence between a second traffic type and a third cost . . . , and a correspondence between an $M^{th}$ traffic type and an $(M+1)^{th}$ cost, where M is an integer greater than or equal to 2. In an initial state, a cost corresponding to each traffic type may be set to be equal, in other words, the first cost=the third cost= . . . =the $(M+1)^{th}$ cost. In another case, the correspondence may be stored in a form of a second mapping relationship. For another example, the second mapping relationship includes a correspondence between the first traffic type, a first forwarding priority, and a first cost, a correspondence between a second traffic type, a second forwarding priority, and a third cost . . . , and a correspondence between an $M^{th}$ traffic type, an $M^{th}$ forwarding priority, and an $(M+1)^{th}$ cost. In an initial state, a cost corresponding to each traffic type may be set to be equal, in other words, the first cost=the third cost= . . . =the $(M+1)^{th}$ cost, but a relationship of forwarding priorities in descending order is: the first forwarding priority ≥the second forwarding priority ≥ . . . ≥the $(M+1)^{th}$ forwarding priority.

Step 502: The first network device determines that a next hop to which the first network device is to send the first traffic is a second network device.

For example, after receiving the first traffic, the first network device may first determine the first traffic type to which the first traffic belongs, and then determine the first cost corresponding to the first traffic type, to determine a shortest path of the first traffic in a network based on the first cost by using a shortest path first algorithm. Through viewing the shortest path, it may be determined that the next hop of the first network device during sending of the first traffic is the second network device.

For another example, when or before the first traffic enters a network, a preset path is preconfigured for the first traffic through manual configuration or by using another path selection algorithm, and related information of the preset path is configured on each network device through which the preset path passes. The related information includes the following configured on the first network device: The next hop to which the first traffic is to be sent is the second network device. After receiving the first traffic, the first network device may determine, based on the information that is preconfigured on the first network device to indicate that "the next hop to which the first traffic is to be sent is the second network device", that the next hop of the first network device during sending of the first traffic is the second network device.

Step 503: When a link from the first network device to the second network device is congested, the first network device adjusts the first cost corresponding to the first traffic type to the second cost.

In an embodiment, when no congestion is found on the link from the first network device to the second network device, after determining that the next hop through which the received first traffic needs to pass is the second network device, the first network device may directly send the first traffic to the second network device. However, when the first network device finds, before sending the first traffic to the second network device, that the link from the first network device to the second network device meets a preset link congestion condition, the first network device may determine that the link from the first network device to the second network device is congested. In this case, the first network device may adjust the first cost corresponding to the first traffic type to which the first traffic belongs in the correspondence that is between a traffic type and a cost and that is stored on the first network device, and record the adjusted first cost as the second cost, so that a forwarding path of the first traffic may be re-calculated and determined based on the second cost obtained after the adjustment, to avoid the current congested link.

For example, that the first network device adjusts the first cost corresponding to the first traffic type to the second cost specifically includes: The first network device increases the first cost to obtain the second cost corresponding to the first traffic type. For example, the first cost 10 may be adjusted to 100, or the first cost 10 is increased by 9 times to obtain the second cost 100. In this way, increasing the first cost to the second cost provides a data basis for subsequently avoiding the current congested link and being forwarded from a non-congested link.

It should be noted that, because the correspondence between a traffic type and a cost belongs to global configuration information, after the first network device adjusts the first cost corresponding to the first traffic type to the second cost, an adjusted correspondence that is between the first traffic type and the second cost and that is on the first network device may be sent to another network device in the network. In an embodiment, the first network device may associate the second cost with an identifier of the first traffic type and publish the second cost and the identifier of the first traffic type in the network: or the first network device may publish the correspondence between the first traffic type and the second cost in the network: or the first network device may publish a mapping relationship that is stored on the first network device and that includes the correspondence between the first traffic type and the second cost in the network as a whole.

It should be noted that, for a specific publishing manner, refer to the descriptions of a related part of "a specific manner in which the network device publishes a correspondence between a traffic type and a cost in a network" before this embodiment is described.

Step 504: The first network device determines, based on the second cost, that the next hop to which the first network device is to send the first traffic is a third network device.

Step 505: The first network device sends the first traffic to the third network device.

In an embodiment, the first network device may determine, based on the second cost and based on the shortest path first algorithm, a path for sending the first traffic, and then determine, based on the determined path for sending the first traffic, that the next hop of the first network device is the third network device; and the first network device sends the first traffic to the third network device. In this way, the first traffic can avoid the congested link from the first network device to the second network device, and properly use a non-congested link from the first network device to the third network device in the network, to effectively forward the first traffic in the network.

In this way, costs corresponding to different traffic types on a congested link are adjusted, to avoid, as much as possible, a case in which all types of traffic preempt a bandwidth resource on the congested link, so that some types of traffic can properly use a bandwidth resource on another non-congested link in the network, to ensure that all traffic in the network can be effectively forwarded, and improve a traffic forwarding rate in the network.

In some embodiments, because traffic in the network changes dynamically in real time, a time at which link congestion occurs and time for which link congestion is maintained are not fixed. In addition, if the link is not congested, a shortest path calculated by using an unadjusted cost is used to forward traffic, so that a forwarding latency of the traffic can be reduced. Therefore, this embodiment of this application may further include: After it is determined that the link from the first network device to the second network device is congested, and the first network device adjusts the first cost corresponding to the first traffic type to the second cost, the first network device may monitor, in preset duration, a congestion status of the link between the first network device and the second network device, and once it is determined that the link from the first network device to the second network device is not congested, the first network device restores the second cost corresponding to the first traffic type to the first cost.

In one case, the preset duration is a fixed constant, in other words, the first network device periodically monitors the congestion status of the link from the first network device to the second network device, and the preset duration (for example, 10 minutes) is a preset period. In another case, the preset duration is a variable that includes penalty duration. For example, at a fifth minute (denoted as a moment T1) after the first cost is adjusted to the second cost, the first network device monitors the congestion status of the link from the first network device to the second network device for a first time. If the link is congested, the first network device monitors the congestion status of the link from the first network device to the second network device for a second time after 5×4=20 minutes (denoted as a moment T2) after the moment T1. If the link is congested, the first network device monitors the congestion status of the link from the first network device to the second network device for a third time after 20)×4-80) minutes (denoted as a moment T3) after the moment T2, . . . , and so on, until it is determined that the link from the first network device to the second network device is not congested, the first network device restores the second cost corresponding to the first traffic type to the first cost.

Figure 6:
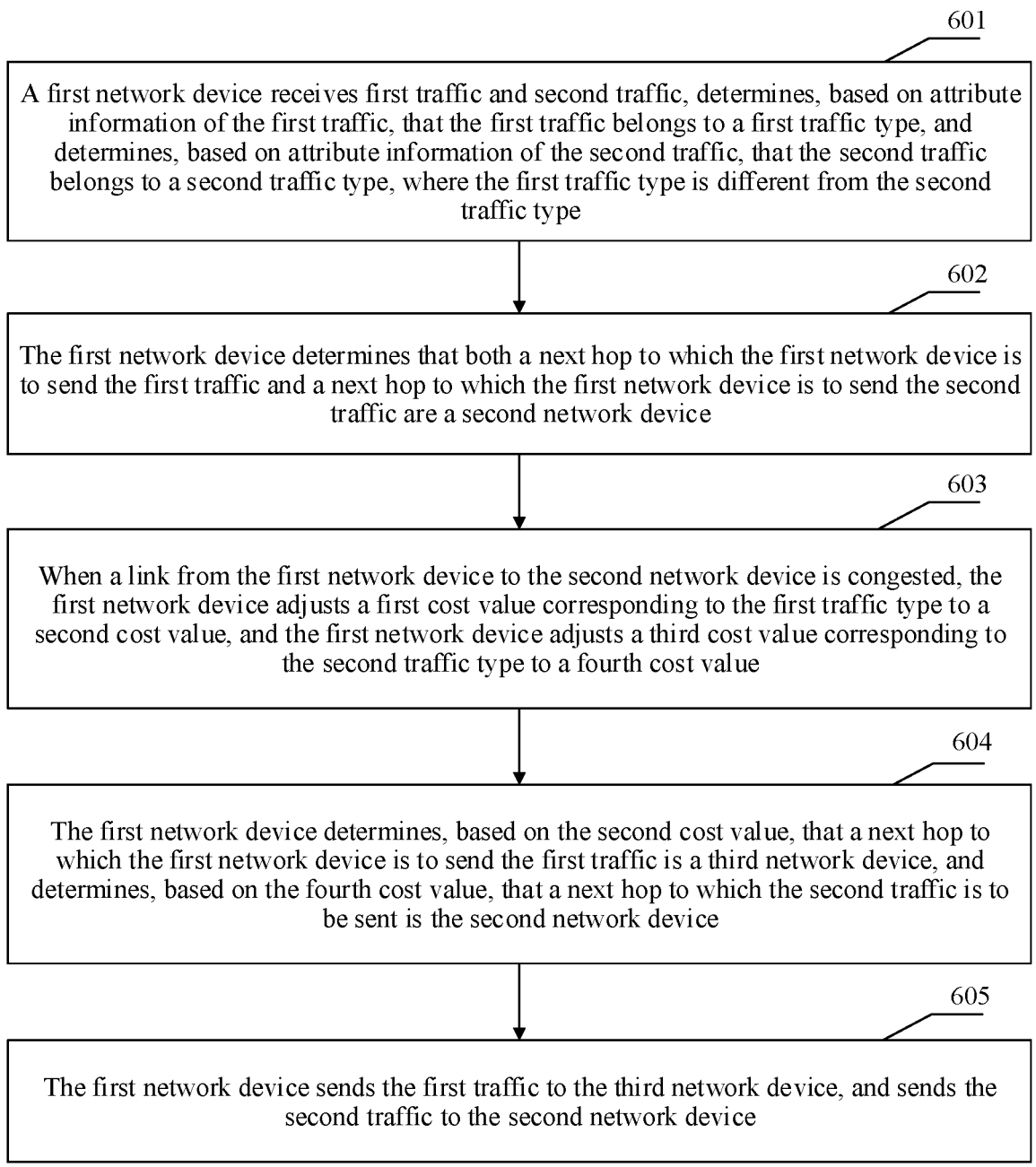
FIG. 6 is a schematic flowchart of another traffic sending method according to an embodiment of this application.

FIG. 6 is a schematic flowchart of another traffic sending method according to an embodiment of this application. As shown in FIG. 6, the method may specifically include step 601 to step 605.

Step 601: A first network device receives first traffic and second traffic, determines, based on attribute information of the first traffic, that the first traffic belongs to a first traffic type, and determines, based on attribute information of the second traffic, that the second traffic belongs to a second traffic type.

In an embodiment, after receiving the first traffic and the second traffic, the first network device may separately obtain a traffic attribute of the first traffic and a traffic attribute of the second traffic, and then perform matching based on the traffic attribute of the first traffic and a preset traffic attribute corresponding to each traffic type. If the traffic attribute of the first traffic matches the preset traffic attribute, it may be determined that the first traffic belongs to the traffic type, and the successfully matched traffic type may be determined as the first traffic type to which the first traffic belongs. Similarly, matching is performed based on the traffic attribute of the second traffic and the preset traffic attribute corresponding to each traffic type, and if the traffic attribute of the second traffic matches the preset traffic attribute, it may be determined that the second traffic belongs to the traffic type, and the successfully matched traffic type may be determined as the second traffic type to which the second traffic belongs.

It should be noted that the first traffic type and the second traffic type may be a same traffic type, or may be different traffic types. The following implementation of this embodiment of this application is described by using a case in which the first traffic type and the second traffic type are two different traffic types.

For example, if a traffic type in a correspondence that is between a traffic type and a cost and that is prestored on the first network device is a traffic identifier obtained after classification is performed based on a priority identifier in a QoS concept, and in addition, in the first network device, CS traffic and EF traffic are configured to be associated with a traffic type 1, and AF traffic and BE traffic are configured to be associated with a traffic type 2, after receiving the first traffic and the second traffic, the first network device obtains a traffic identifier of the first traffic by parsing the first traffic, to indicate that the first traffic is the BE traffic, and may determine, by separately matching the BE traffic with traffic identifiers in the traffic type 1 and the traffic type 2, that the first traffic successfully matches the traffic type 2. Therefore, the first traffic type to which the first traffic belongs may be determined as the traffic type 2. The first network device obtains a traffic identifier of the second traffic by parsing the second traffic, to indicate that the second traffic is the CS traffic, and may determine, by separately matching the CS traffic with the traffic identifiers in the traffic type 1 and the traffic type 2, that the second traffic successfully matches the traffic type 1. Therefore, the second traffic type to which the second traffic belongs may be determined as the traffic type 1.

It should be noted that, the correspondence that is between a traffic type and a cost and that is stored on the first network device includes at least a correspondence between the first traffic type and a first cost, and a correspondence between the second traffic type and a third cost, where the first cost is equal to the third cost, or the third cost may be not strictly equal to the first cost, but shortest paths determined based on the first cost and the third cost by using a shortest path first algorithm need to include a link between the first network device and a second network device.

Step 602: The first network device determines that both a next hop to which the first network device is to send the first traffic and a next hop to which the first network device is to send the second traffic are the second network device.

In an embodiment, the first network device may determine, based on a preset path or shortest paths calculated based on the first cost and the third cost, that next-hop network devices of the first network device for the received first traffic and the received second traffic are the second network device.

Step 603: When a link from the first network device to the second network device is congested, the first network device adjusts the first cost corresponding to the first traffic type to a second cost, and the first network device adjusts the third cost corresponding to the second traffic type to a fourth cost.

In an embodiment, when no congestion is found on the link from the first network device to the second network device, after determining that a next hop through which the received first traffic and the received second traffic need to pass is the second network device, the first network device may directly send the first traffic and the second traffic to the second network device. However, when the first network device finds, before sending the first traffic to the second network device, that the link from the first network device to the second network device meets a preset link congestion condition, the first network device may determine that the link from the first network device to the second network device is congested. In this case, the first network device may adjust the first cost corresponding to the first traffic type to which the first traffic belongs in the correspondence that is between a traffic type and a cost and that is stored on the first network device, and record the adjusted first cost as the second cost. Similarly, the first network device may adjust the third cost corresponding to the second traffic type to which the second traffic belongs in the correspondence that is between a traffic type and a cost and that is stored on the first network device, and record the adjusted third cost as the fourth cost, so that respective forwarding paths of the first traffic and the second traffic may be re-calculated and determined based on the second cost and the fourth cost that are obtained after the adjustment, to avoid the current congested link.

It should be noted that "adjust" in "the first cost corresponding to the first traffic type is adjusted to the second cost" and "the first network device adjusts the third cost corresponding to the second traffic type to the fourth cost" may mean "increase", "reduce", or "keep unchanged".

For example, that the first network device adjusts the first cost corresponding to the first traffic type to the second cost and adjusts the third cost corresponding to the second traffic type to the fourth cost may specifically include: The first network device increases the first cost, and reduces the third cost or keeps the third cost unchanged, in other words, the second cost is greater than the first cost, and the fourth cost is less than or equal to the third cost. Therefore, two different paths corresponding to the first traffic and the second traffic may be calculated based on a shortest path first algorithm, where the path corresponding to the first traffic includes a link from the first network device to the third network device, and the path corresponding to the second traffic includes the link from the first network device to the second network device. Such adjustment provides a data basis for the first traffic to subsequently avoid the current congested link, for the second traffic to continue to use an original link, and for properly using a link resource in a network to forward traffic.

For another example, that the first network device adjusts the first cost corresponding to the first traffic type to the second cost and adjusts the third cost corresponding to the second traffic type to the fourth cost may alternatively specifically include: The first network device reduces the first cost or keeps the first cost unchanged, and increases the third cost, in other words, the second cost is less than or equal to the first cost, and the fourth cost is greater than the third cost. Therefore, two different paths corresponding to the first traffic and the second traffic may be calculated based on a shortest path first algorithm, where the path corresponding to the first traffic includes the link from the first network device to the second network device, and the path corresponding to the second traffic includes a link from the first network device to the third network device. Such adjustment provides a data basis for the second traffic to subsequently avoid the current congested link, for the first traffic to continue to use an original link, and for properly using a link resource in a network to forward traffic.

It should be noted that, because the correspondence between a traffic type and a cost belongs to global configuration information, and the traffic type is also obtained based on a globally unified traffic classification standard, the first network device may send, to another network device in the network, the adjusted correspondence between the first traffic type and the second cost and the adjusted correspondence between the second traffic type and the fourth cost. It should be noted that, for a specific publishing manner, refer to the descriptions of a related part of "a specific manner in which the network device publishes a correspondence between a traffic type and a cost in a network" before this embodiment is described.

Step 604: The first network device determines, based on the second cost, that a next hop to which the first network device is to send the first traffic is the third network device, and determines, based on the fourth cost, that a next hop to which the second traffic is to be sent is the second network device.

Step 605: The first network device sends the first traffic to the third network device, and sends the second traffic to the second network device.

For example, the first network device may determine, based on the second cost and based on the shortest path first algorithm, a path for sending the first traffic, and then determine, based on the determined path for sending the first traffic, that the next hop of the first network device is the third network device. The first network device may further determine, based on the fourth cost and based on the shortest path first algorithm, a path for sending the second traffic, and then determine, based on the determined path for sending the second traffic, that the next hop of the first network device is the second network device. In this way, the first network device separately sends the first traffic and the second traffic to the third network device and the second network device. In this way, the first traffic can avoid the congested link from the first network device to the second network device, and properly use a non-congested link from the first network device to the third network device in the network, to effectively forward the first traffic in the network.

For another example, the first network device may determine, based on the second cost and based on the shortest path first algorithm, a path for sending the first traffic, and then determine, based on the determined path for sending the first traffic, that the next hop of the first network device is the second network device. The first network device may further determine, based on the fourth cost and based on the shortest path first algorithm, a path for sending the second traffic, and then determine, based on the determined path for sending the second traffic, that the next hop of the first network device is the third network device. In this way, the second traffic can avoid the congested link from the first network device to the second network device, and properly use a non-congested link from the first network device to the third network device in the network, to effectively forward the first traffic in the network.

In this way, costs corresponding to different traffic types on the congested link are adjusted, to avoid, as much as possible, a case in which all types of traffic preempt a bandwidth resource on the congested link, so that some types of traffic can properly use a bandwidth resource on another non-congested link in the network, to ensure that all traffic in the network can be effectively forwarded, and improve a traffic forwarding rate in the network.

It may be understood that, in the foregoing embodiments shown in FIG. 5 and FIG. 6, a method for sending traffic of two traffic types is used as an example for description. However, a preset correspondence in this embodiment of this application may specifically include correspondences between two or more different traffic types and costs.

To make the traffic sending method provided in the embodiments of this application clearer, a specific example including correspondences between three traffic types and costs is described below:

The network architecture shown in FIG. 1 is used as an example to describe the example of this application. A mapping relationship that corresponds to a link X from the port B5 to the port C1 and that is stored on the network device B in the network may specifically include: a high forwarding priority—an EF traffic type—a cost 10, a medium forwarding priority—an AF traffic type—the cost 10, and a low forwarding priority—a BE traffic type—the cost 10. Costs corresponding to three traffic types of a link Y from a port B4 to a port G2 are 20, and costs corresponding to three traffic types of a link Z from a port B3 to a port F3 are also 20. Maximum physical link bandwidth of the link X is 50 Gbps, maximum physical link bandwidth of the link Y is 70 Gbps, and maximum physical link bandwidth of the link Z is 40 Gbps.

Figure 7:
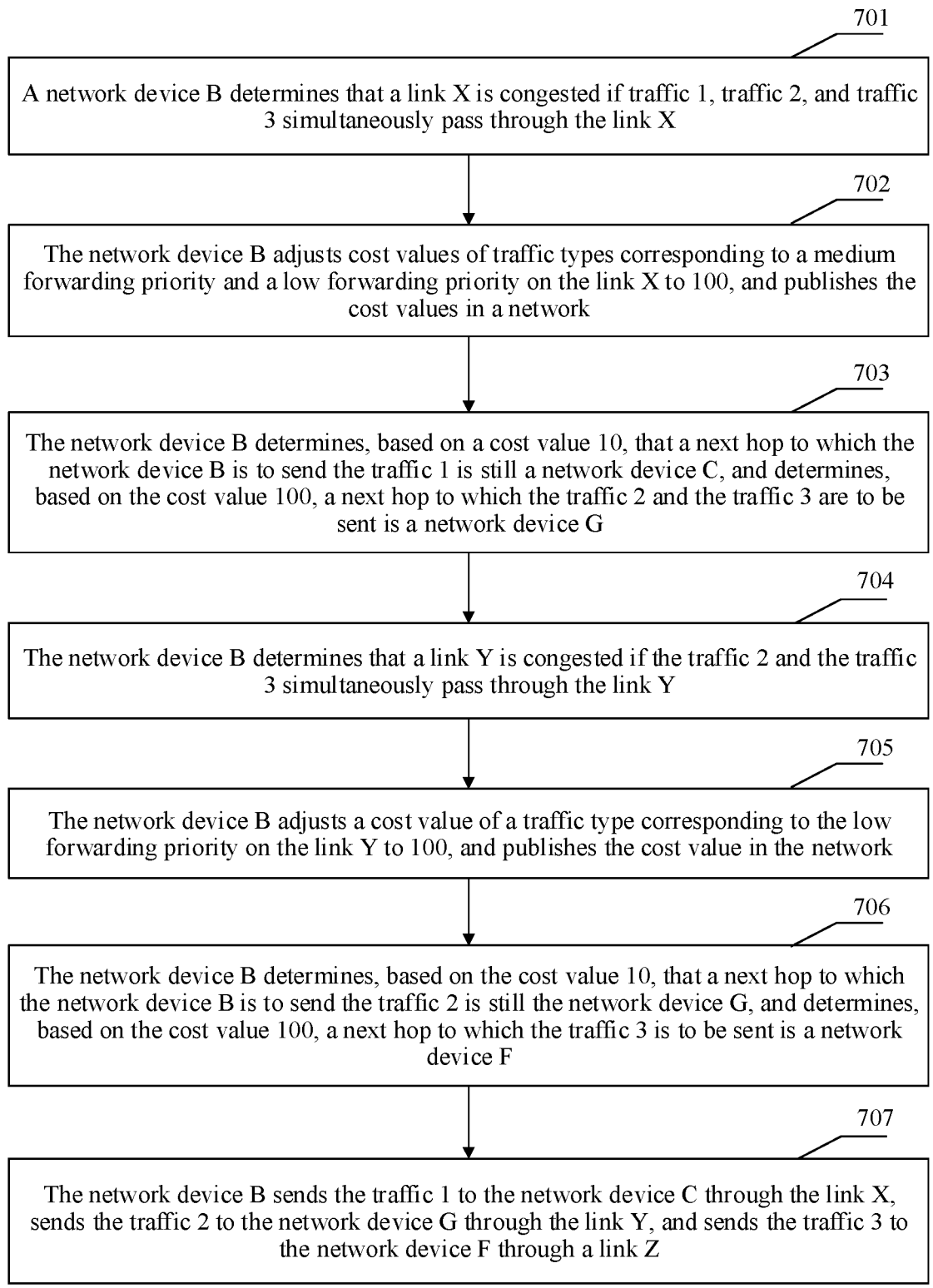
FIG. 7 is a schematic flowchart of an example of a traffic sending method according to an embodiment of this application.

For example, if EF traffic 1 of a traffic rate 10 Gbps, AF traffic 2 of a traffic rate 60 Gbps, and BE traffic 3 of a traffic rate 30 Gbps are approximately simultaneously received in the network, and it is learned through calculation based on a shortest path first algorithm, that paths of the three pieces of traffic each include the link X, when the network device B receives the traffic 1, the traffic 2, and the traffic 3, as shown in FIG. 7, this example may specifically include the following steps.

Step 701: The network device B determines that the link X is congested if the traffic 1, the traffic 2, and the traffic 3 simultaneously pass through the link X.

It may be understood that, because a sum of traffic rates of the traffic 1, the traffic 2, and the traffic 3 is equal to 10 Gbps+60 Gbps+30 Gbps=100 Gbps, and is greater than the maximum physical link bandwidth 50 Gbps of the link X, it may be determined that the link X is congested.

Step 702: The network device B adjusts costs of traffic types corresponding to the medium forwarding priority and the low forwarding priority on the link X to 100, and publishes the costs in the network.

Step 703: The network device B determines, based on the cost 10, that a next hop to which the network device B is to send the traffic 1 is still a network device C, and determines, based on the cost 100, a next hop to which the traffic 2 and the traffic 3 are to be sent is a network device G.

Step 704: The network device B determines that the link Y is congested if the traffic 2 and the traffic 3 simultaneously pass through the link Y.

It may be understood that, because a sum of traffic rates of the traffic 2 and the traffic 3 is equal to 60 Gbp+30 Gbps=90 Gbps, and is greater than the maximum physical link bandwidth 70 Gbps of the link Y, it may be determined that the link Y is congested.

Step 705: The network device B adjusts a cost of a traffic type corresponding to the low forwarding priority on the link Y to 100, and publishes the cost in the network.

In this case, a mapping relationship that corresponds to the link Y and that is stored on the network device B may specifically include: a high forwarding priority—an EF traffic type—a cost 20, a medium forwarding priority—an AF traffic type—the cost 20, and a low forwarding priority—a BE traffic type—the cost 100.

Step 706: The network device B determines, based on the cost 10, that a next hop to which the network device B is to send the traffic 2 is still the network device G, and determines, based on the cost 100, a next hop to which the traffic 3 is to be sent is a network device F.

Step 707: The network device B sends the traffic 1 to the network device C through the link X, sends the traffic 2 to the network device G through the link Y, and sends the traffic 3 to the network device F through the link Z.

In this way, when a link between network devices is congested, costs corresponding to different traffic types are dynamically adjusted, so that traffic corresponding to the different traffic types uses different link bandwidth resources in the network and no longer preempts a bandwidth resource on a same link. Therefore, the traffic can properly use a bandwidth resource on a non-congested link in the network, to ensure that the traffic in the network can be effectively forwarded, and improve a traffic forwarding rate in the network.

It should be noted that, in this embodiment of this application, classification of traffic types may be flexibly set based on an actual requirement, a storage format of a correspondence stored on the network device and whether a forwarding priority is included may also be flexibly configured based on a requirement, and a mechanism used by the network device to adjust the correspondence stored on the network device and a form of publishing the adjusted correspondence in the network may also be flexibly configured based on a requirement. In addition, when more than two traffic types are included, an adjustment mechanism during sending of traffic may also be flexibly configured based on an actual situation. As shown above, this embodiment of this application is merely an example for description. Any embodiment in which costs corresponding to different traffic types can be dynamically adjusted in the embodiments of this application, traffic can properly use a bandwidth resource on a non-congested link in the network, it is ensured that all traffic in the network can be effectively forwarded, and a traffic forwarding rate in the network is improved falls within the protection scope of the embodiments of this application.

Figure 8:
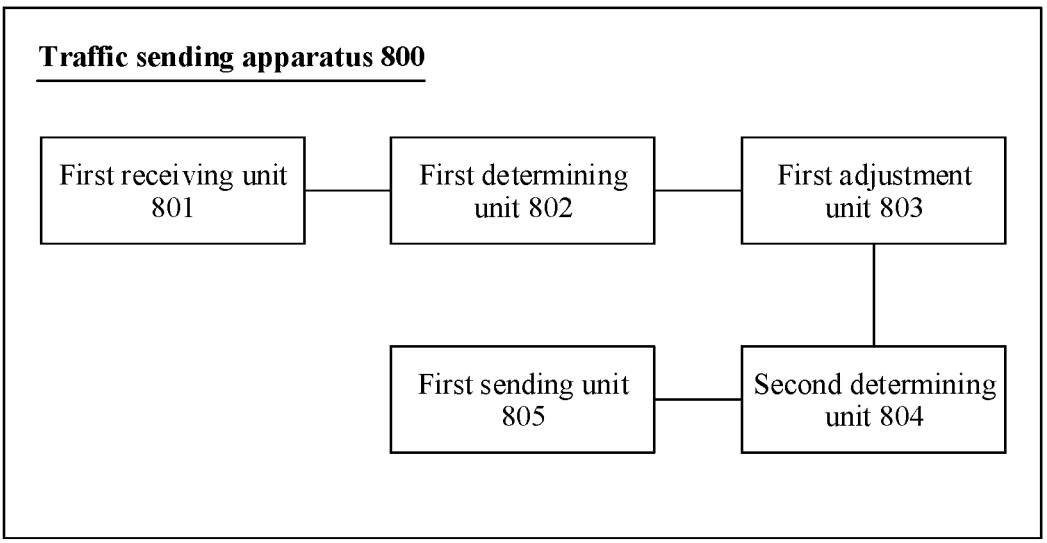
FIG. 8 is a schematic structural diagram of a traffic sending apparatus according to an embodiment of this application.

FIG. 8 is a schematic structural diagram of a traffic sending apparatus 800 according to an embodiment of this application. The apparatus 800 may be a first network device, and the apparatus 800 may include a first receiving unit 801, a first determining unit 802, a first adjustment unit 803, a second determining unit 804, and a first sending unit 805.

The first receiving unit 801 is configured to receive first traffic.

The first determining unit 802 is configured to determine, based on attribute information of the first traffic, that the first traffic belongs to a first traffic type.

The first adjustment unit 803 is configured to: when a link from the first network device to a second network device is congested, adjust a first cost corresponding to the first traffic type to a second cost, where the second network device is a next hop that is determined by the first network device based on the first cost and to which the first traffic is to be sent.

The second determining unit 804 is configured to determine, based on the second cost, that the next hop to which the first network device is to send the first traffic is a third network device.

The first sending unit 805 is configured to send the first traffic to the third network device.

It should be noted that the apparatus 800 is configured to perform steps corresponding to the foregoing embodiment shown in FIG. 5, to send traffic based on the traffic sending method provided in the embodiments of this application. The first receiving unit 801 and the first determining unit 802 correspond to step 501, the first adjustment unit 803 corresponds to step 502 and step 503, the second determining unit 804 corresponds to step 504, and the first sending unit 805 may perform step 505.

In an embodiment, the apparatus 800 may further include a second receiving unit, a third determining unit, a second adjustment unit, a fourth determining unit, and a second sending unit.

The second receiving unit is configured to receive second traffic.

The third determining unit determines, based on attribute information of the second traffic, that the second traffic belongs to a second traffic type, where the first traffic type is different from the second traffic type.

The second adjustment unit is configured to: when the link from the first network device to the second network device is congested, adjust a third cost corresponding to the second traffic type to a fourth cost, where the second network device is a next hop that is determined by the first network device based on the third cost and to which the second traffic is to be sent.

The fourth determining unit is configured to determine, based on the fourth cost, that the next hop to which the second traffic is to be sent is the second network device.

The second sending unit is configured to send the second traffic to the second network device.

It may be understood that, a first mapping relationship is preset on the first network device, and the first mapping relationship includes a correspondence between the first traffic type and the first cost and a correspondence between the second traffic type and the third cost: or a second mapping relationship is preset on the first network device, and the second mapping relationship includes a correspondence between the first traffic type, a first forwarding priority, and the first cost and a correspondence between the second traffic type, a second forwarding priority, and the third cost. The first cost is equal to the third cost.

In another embodiment, the first adjustment unit 803 of the apparatus 800 is specifically configured to: increase, by the first network device, the first cost to obtain the second cost corresponding to the first traffic type, where the third network device and the second network device are different network devices: or reduce, by the first network device, the first cost or keep the first cost unchanged, to obtain the second cost corresponding to the first traffic type, where the third network device and the second network device are a same network device.

In still another embodiment, the apparatus 800 may further include a third sending unit. The third sending unit is configured to: after the first cost corresponding to the first traffic type is adjusted to the second cost, send a correspondence between the first traffic type and the second cost to another network device.

In an embodiment, the apparatus 800 may further include a judgment unit and a third adjustment unit. The judgment unit is configured to: after the first cost corresponding to the first traffic type is adjusted to the second cost, determine, based on preset duration, whether the link from the first network device to the second network device is congested. The third adjustment unit is configured to: when the link from the first network device to the second network device is not congested, restore the second cost corresponding to the first traffic type to the first cost.

In yet another embodiment, the second determining unit 804 of the apparatus 800 includes a first determining subunit and a second determining subunit. The first determining subunit is configured to determine, based on the second cost, a path for sending the first traffic. The second determining subunit is configured to determine, based on the path for sending the first traffic, that a next hop of the first network device is the third network device.

It should be noted that the traffic sending apparatus 800 provided in this embodiment of this application corresponds to the foregoing traffic sending method. Therefore, for various possible implementations and technical effects achieved by the apparatus 800, refer to related descriptions in the foregoing embodiments corresponding to FIG. 5 to FIG. 7.

Figure 9:
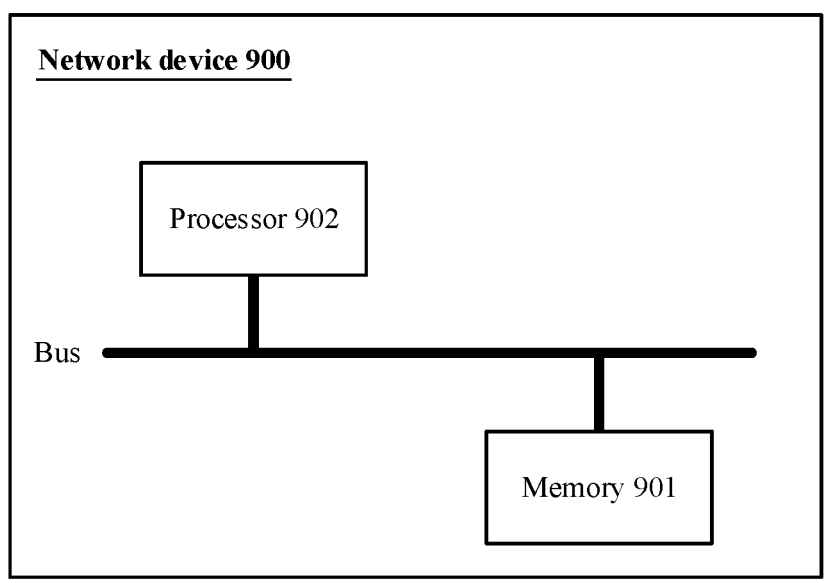
FIG. 9 is a schematic structural diagram of a network device according to an embodiment of this application.

In addition, an embodiment of this application further provides a network device 900. As shown in FIG. 9, the network device 900 includes a memory 901 and a processor 902. The memory 901 is configured to store program code. The processor 902 is configured to run instructions in the program code, so that the network device performs the traffic sending method in any implementation in the embodiments corresponding to FIG. 5 to FIG. 7.

For example, the network device 900 may further include a communications interface, configured to receive first traffic and send the first traffic to a third network device. The communications interface is configured to exchange data with another network device, for example, receive the first traffic from the another network device through the communications interface, or send second traffic to the another network device through the communications interface.

For example, the processor 902 of the network device 900 is configured to run the instructions in the program code stored in the memory 901, so that the network device performs the following traffic sending method:

determining, based on attribute information of the first traffic, that the first traffic belongs to a first traffic type:

when a link from a first network device to a second network device is congested, adjusting a first cost corresponding to the first traffic type to a second cost, where the second network device is a next hop that is determined by the first network device based on the first cost and to which the first traffic is to be sent; and determining, based on the second cost, that the next hop to which the first network device is to send the first traffic is the third network device.

In addition, an embodiment of this application further provides a computer program product, and when the computer program product is run on a computer, the computer is enabled to perform the traffic sending method in any implementation in the embodiments corresponding to FIG. 5 to FIG. 7.

For example, when the computer program product is run on the computer, such as a first network device, the computer is enabled to perform the following traffic sending method:

receiving first traffic, and determining, based on attribute information of the first traffic, that the first traffic belongs to a first traffic type:

when a link from the first network device to a second network device is congested, adjusting a first cost corresponding to the first traffic type to a second cost, where the second network device is a next hop that is determined by the first network device based on the first cost and to which the first traffic is to be sent:

determining, based on the second cost, that the next hop to which the first network device is to send the first traffic is the third network device; and sending the first traffic to the third network device.

In addition, an embodiment of this application further provides a computer-readable storage medium, the computer-readable storage medium stores instructions, and when the instructions are run on a computer, the computer is enabled to perform the traffic sending method in any implementation in the embodiments corresponding to FIG. 5 to FIG. 7.

For example, the computer-readable storage medium stores instructions, and when the instructions are run on a computer, such as a first network device, the computer is enabled to perform the following traffic sending method:

receiving first traffic, and determining, based on attribute information of the first traffic, that the first traffic belongs to a first traffic type:

when a link from the first network device to a second network device is congested, adjusting a first cost corresponding to the first traffic type to a second cost, where the second network device is a next hop that is determined by the first network device based on the first cost and to which the first traffic is to be sent:

determining, based on the second cost, that the next hop to which the first network device is to send the first traffic is the third network device; and sending the first traffic to the third network device.

"First" in names such as "first cost" and "first cost" mentioned in the embodiments of this application is merely used as a name identifier, and does not represent the first in a sequence. This rule is also applicable to "second" and the like.

It may be learned from the foregoing descriptions of the implementations that a person skilled in the art may clearly understand that all or some of the steps in the foregoing method embodiments may be implemented in a form of software and a universal hardware platform. Based on such an understanding, the technical solutions of this application may be embodied in a form of a software product. The computer software product may be stored in a storage medium, such as a read-only memory (English: read-only memory, ROM)/RAM, a magnetic disk, or an optical disc, and includes several instructions for enabling a computer device (which may be a network communications device such as a personal computer, a server, or a router) to perform the methods described in the embodiments of this application or some parts of the embodiments.

The embodiments in this specification are described in a progressive manner. A same or similar part of the embodiments may be referred to each other, and each embodiment focuses on a difference from another embodiment. In particular, for the apparatus embodiment, because the apparatus embodiment is basically similar to the method embodiment, the apparatus embodiment is described relatively simply. For related parts, refer to partial descriptions of the method embodiment. The described apparatus embodiment is merely an example. The modules described as separate parts may or may not be physically separate, and parts displayed as modules may or may not be physical modules, may be located in one place, or may be distributed on a plurality of network units. Some or all of the modules may be selected based on an actual requirement to implement the objectives of the solutions in the embodiments. A person of ordinary skill in the art may understand and implement the solutions without any creative effort.

The foregoing descriptions are merely example implementations of this application, and are not intended to limit the protection scope of this application.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A traffic sending method, comprising:
receiving, by a first network device, first traffic comprising first attribute information, wherein the first attribute information identifies a first traffic type of the first traffic;
when a first link from the first network device to a second network device is congested, adjusting, by the first network device, a first cost corresponding to the first traffic type to a second cost, wherein the first link is used to forward the first traffic when the cost corresponding to the first traffic is the first cost;
sending, by the first network device, the first traffic to a third network device via a second link from the first network device to the third network device; and
sending, by the first network device, a correspondence between the first traffic type and the second cost to another network device.

2. The method according to claim 1, further comprising:
receiving, by the first network device, second traffic comprising second attribute information, wherein the second attribute information identifies a second traffic type of the second traffic, wherein the first traffic type is different from the second traffic type;
when the first link from the first network device to the second network device is congested, adjusting, by the first network device, a third cost corresponding to the second traffic type to a fourth cost, wherein the first link is used to forward the second traffic when the cost corresponding to the first traffic is the third cost; and
sending, by the first network device, the second traffic to the second network device via the first link, wherein the first link is used to forward the second traffic when the cost corresponding to the first traffic is the fourth cost.

3. The method according to claim 2, wherein
the first network device comprises a correspondence between the first traffic type and the first cost and a correspondence between the second traffic type and the third cost; or
the first network device comprises a correspondence between the first traffic type, a first forwarding priority, and the first cost and a correspondence between the second traffic type, a second forwarding priority, and the third cost; wherein
the first cost is equal to the third cost.

4. The method according to claim 1, wherein the second cost is greater than the first cost, the third network device and the second network device are different network devices; or
  wherein the second cost is smaller than the first cost, the third network device and the second network device are a same network device.
5. The method according to claim 1, wherein after the adjusting, by the first network device, a first cost corresponding to the first traffic type to a second cost, the method further comprises:
  when the link from the first network device to the second network device is not congested, adjusting, by the first network device, the second cost to the first cost.
6. The method according to claim 1, further comprises:
  determining, by the first network device based on the second cost, a path for sending the first traffic, wherein the path comprises the second link.
7. A first network device for sending traffic, comprising:
  a memory comprising instructions;
  a processor coupled to the memory, wherein when executed by the processor, the instructions cause the first network device to:
  receive first traffic comprising first attribute information, wherein the first attribute information identifies the first traffic belongs to a first traffic type;
  when a first link from the first network device to a second network device is congested, adjust a first cost corresponding to the first traffic type to a second cost, wherein the first link is used to forward the first traffic when the cost corresponding to the first traffic is the first cost;
  send the first traffic to the a network device via a second link from the first network device to the third network device; and
  send a correspondence between the first traffic type and the second cost to another network device.
8. The first network device according to claim 7, wherein the instructions, when executed by the processor, further cause the first network device to:
  receive second traffic comprising second attribute information, wherein the second attribute information identifies the second traffic belongs to a second traffic type, wherein the first traffic type is different from the second traffic type;
  when the first link from the first network device to the second network device is congested, adjust a third cost corresponding to the second traffic type to a fourth cost, wherein the first link is used to forward the second traffic when the cost corresponding to the first traffic is the third cost; and
  send the second traffic to the second network device via the first link, wherein the first link is used to forward the second traffic when the cost corresponding to the first traffic is the fourth cost.
9. The first network device according to claim 8, wherein
  the first network device comprises a correspondence between the first traffic type and the first cost and a correspondence between the second traffic type and the third cost; or
  the first network device comprises a correspondence between the first traffic type, a first forwarding priority, and the first cost and a correspondence between the second traffic type, a second forwarding priority, and the third cost; wherein
  the first cost is equal to the third cost.

10. The first network device according to claim 7, wherein the second cost is greater than the first cost, the third network device and the second network device are different network devices; or
  wherein the second cost is smaller than the first cost, the third network device and the second network device are a same network device.
11. The first network device according to claim 7, wherein the instructions, when executed by the processor, further cause the first network device to:
  when the link from the first network device to the second network device is not congested, adjust the second cost to the first cost.
12. The apparatus according to claim 7, wherein the instructions, when executed by the processor, further cause the first network device to:
  determine, based on the second cost, a path for sending the first traffic; and
  send, on the path for sending the first traffic, the first traffic to the third network device.
13. A non-transitory computer-readable storage medium, wherein the computer-readable storage medium stores instructions, and when the instructions are run on a processor, the processor is enabled to perform a method comprising:
  receiving first traffic comprising first attribute information, wherein the first attribute information identifies the first traffic belongs to a first traffic;
  when a first link from the first network device to a second network device is congested, adjusting, by the first network device, a first cost corresponding to the first traffic type to a second cost, wherein the first link is used to forward the first traffic when the cost corresponding to the first traffic is the first cost;
  sending the first traffic to a third network device via a second link from the first network device to the third network device; and
  sending a correspondence between the first traffic type and the second cost to another network device.
14. The non-transitory computer-readable storage medium according to claim 13, wherein the method further comprising:
  receiving second traffic comprising second attribute information, wherein the second attribute information identifies the second traffic belongs to a second traffic type, wherein the first traffic type is different from the second traffic type;
  when the first link from the first network device to the second network device is congested, adjusting, by the first network device, a third cost corresponding to the second traffic type to a fourth cost, wherein the first link is used to forward the second traffic when the cost corresponding to the first traffic is the third cost; and
  sending the second traffic to the second network device via the first link, wherein the first link is used to forward the second traffic when the cost corresponding to the first traffic is the fourth cost.
15. The non-transitory computer-readable storage medium according to claim 14, wherein
  the first network device comprises a correspondence between the first traffic type and the first cost and a correspondence between the second traffic type and the third cost; or
  the first network device comprises a correspondence between the first traffic type, a first forwarding priority, and the first cost and a correspondence between the second traffic type, a second forwarding priority, and the third cost; wherein the first cost is equal to the third cost.

16. The non-transitory computer-readable storage medium according to claim 13, wherein the second cost is greater than the first cost, the third network device and the second network device are different network devices; or wherein the second cost is smaller than the first cost, the third network device and the second network device are a same network device.

17. The non-transitory computer-readable storage medium according to claim 13, wherein after the adjusting, by the first network device, a first cost corresponding to the first traffic type to a second cost, the method further comprises:

when the link from the first network device to the second network device is not congested, adjusting, by the first network device, the second cost to the first cost.

\* \* \* \* \*